US006812853B1

United States Patent
(12) Matsui

(10) Patent No.: US 6,812,853 B1
(45) Date of Patent: Nov. 2, 2004

(54) TELEMETERING SYSTEM

(75) Inventor: Takahiro Matsui, Tokyo (JP)

(73) Assignee: Wellpine Communications Co., Ltd., Tokyo (JP)

( * ) Notice: Subject to any disclaimer, the term of this patent is extended or adjusted under 35 U.S.C. 154(b) by 0 days.

(21) Appl. No.: 09/856,356

(22) PCT Filed: Nov. 26, 1999

(86) PCT No.: PCT/JP99/06628

§ 371 (c)(1), (2), (4) Date: May 22, 2001

(87) PCT Pub. No.: WO00/33275

PCT Pub. Date: Jun. 8, 2000

(30) Foreign Application Priority Data

Nov. 27, 1998 (JP) .......................................... 10-352180

(51) Int. Cl.[7] ......................... G08C 17/00; G08C 19/16
(52) U.S. Cl. ....................... 340/870.1; 73/387; 702/104
(58) Field of Search ............................. 340/870.1, 601, 340/602; 73/387; 702/107, 85, 104

(56) References Cited

U.S. PATENT DOCUMENTS 4,106,343 A * 8/1978 Cook .......................... 73/387
4,972,099 A * 11/1990 Amano et al. .............. 382/313
5,402,116 A * 3/1995 Ashley .................... 340/870.1
5,897,608 A * 4/1999 Yokoyama et al. ......... 702/107
6,329,817 B1 * 12/2001 Moginine Gummer et al. .. 324/251
6,577,978 B1 * 6/2003 Annan et al. ............... 702/104

* cited by examiner

*Primary Examiner*—Timothy Edwards
(74) *Attorney, Agent, or Firm*—Manabu Kanesaka

(57) ABSTRACT

A telemetering system allows a receiver to provide an indication related linearly with the data from a sensor in a transmitter that comprises an amplifier composed of relatively inexpensive and low-quality parts. The transmitter includes an ID ROM (10) that stores an ID code specifying itself, and it transmits the ID code when transmitting the output from a sensor (1). The receiver includes a correction circuit (13), which finds the correction table corresponding to the transmitter in accordance with the received ID code and corrects the received sensor output on the basis of the correction table.

5 Claims, 2 Drawing Sheets

TELEMETERING SYSTEM

TECHNICAL FIELD

The present invention relates to a so-called telemetering system, such as a system comprising a radiosonde (corresponding to a transmitter described later) having a variety of sensors for detecting atmospheric pressure, temperature and the like high up in the air, which is launched into the sky and transmits the detection data, a receiver for receiving the detection data on the ground and the like.

BACKGROUND ART

FIGS. 2(*a*) and 2(*b*) show one example of a configuration of a conventional telemetering system. That is, the telemetering system comprises a transmitter shown in FIG. 2(*a*) and a receiver shown in FIG. 2(*b*). In the transmitter shown in FIG. 2(*a*), a sensor 1 is a condition detecting element for detecting a condition (for example, temperature, humidity or pressure) at the position where the sensor is placed and providing a sensor output corresponding to the condition. An amplifier 2 is a circuit portion for amplifying the sensor output. An A/D converter 3 is a circuit portion for converting an analog signal of the sensor output, amplified by the amplifier 2, into the corresponding digital signal. A transmission circuit 4 is a circuit portion which modulates a predetermined carrier with the digital signal from the A/D converter 3, and then provides power-amplification and the like for the resultant modulated carrier to generate a transmission signal wave, and then outputs it to a transmitting antenna 5. The transmitting antenna 5 is a circuit portion for receiving the transmission signal wave and emitting the corresponding transmission wave into the air.

On the other hand, in the receiver shown in FIG. 2(*b*), a receiving antenna 6 is a circuit portion for receiving the transmission wave from the antenna 5 and generating an electrical signal corresponding to the transmission wave. A signal processor circuit 7 is a circuit portion for processing the electrical signal from the receiving antenna 6, such as amplifying and demodulating, to generate the received signal corresponding to the sensor output, or a received sensor output, and output the received sensor output. A indicator 8 is a circuit portion for capturing the received sensor output and indicating the received sensor output itself or the corresponding value of condition (for example, temperature value, humidity value or pressure value) converted from this received sensor output.

Although the example described above is a telemetering system using radio wave for the transmission from the transmitter to the receiver, telemetering systems using ultrasound or infrared wave instead of radio wave have been conventionally used.

Now, it is desired as a matter of course that such a telemetering system as described above has a linearity or a linear relationship between the sensor output from the sensor 1 and the received sensor output indicated on the indicator 8 (that is, a relation in which when one is doubled, the other is also doubled, and when one is tripled, the other is also tripled).

Further, the receiver is placed on the side of measurement-persons so as to receive and indicate results of measurement from the transmitter, so that one receiver can be used for many times telemetering. Therefore, as compared to the transmitter (which is often thrown away after use for only one telemetering as the radiosonde described above), the receiver is generally of higher accuracy with higher-quality parts. Thus, operations in any circuit portion of the receiver generally cause no loss of the linearity between both outputs described above. Further, concerning the transmitter, since the A/D converter 3 and the following circuits (the A/D converter 3, transmission circuit 4, transmitting antenna 5) all deal with digital signals, operations in these circuits basically do not cause any loss of the linearity between both outputs described above.

As a result, from the two reasons described above, the assurances of the linearity of the telemetering system depend on whether the amplifier 2 of the transmitter is of high accuracy with high-quality parts (that is, whether the input and output thereof has a linear relationship between them over a wide rang). For this purpose, the amplifier 2 of the transmitter in a telemetering system required to measure with high accuracy is usually of higher accuracy with higher-quality parts, and thus it is so much expensive.

However, it is useless to construct the amplifier 2 described above with high-quality parts, because the amplifiers included in the transmitters are often thrown away without being recovered after use for onetime telemetering.

The present invention has been made in view of the circumstances described above. It is an object of the invention to provide a telemetering system that keeps a linear relationship between a sensor output of the result of detection by a sensor and a received sensor output indicated at the receiver even if an amplifier included in a transmitter is composed of relatively low-quality and inexpensive parts.

DISCLOSURE OF THE INVENTION

The first invention provides a telemetering system that has a transmitter comprising a sensor and transmitting a transmission wave (ultrasound, infrared wave, radio-wave, etc) modulated with an output signal corresponding to a sensor output from the sensor, and a receiver for receiving the transmission wave from the transmitter and processing the transmission wave, such as demodulating, to generate and indicate a received sensor output corresponding to the sensor output, and the receiver in the telemetering system is configured as follows.

That is, the receiver comprises a correction circuit that has a correction table for storing each value of the received sensor outputs in association with the sensor output corresponding to it, and corrects the received sensor outputs such that they may be linear with respect to the sensor outputs on the basis of the correction table, and outputs the corrected received-sensor-output as an object of the indication.

The configuration described above provides a telemetering system that keeps a linear relationship between a sensor output of the result of detection by a sensor and a received sensor output indicated at the receiver even if an amplifier included in a transmitter is composed of relatively low-quality and inexpensive parts.

The second invention provides a telemetering system that has a transmitter comprising a sensor and transmitting a transmission wave (ultrasound, infrared wave, radio-wave, etc.) modulated with an output signal corresponding to a sensor output from the sensor, and a receiver for receiving the transmission wave from the transmitter and processing the transmission wave, such as demodulating, to generate and indicate a received sensor output corresponding to the sensor out, and the telemetering system is configured as follows.

That is, the transmitter has, an amplifier for amplifying the sensor output,

- an A/D converter for digitizing an output of the amplifier,
- a self-ID code storage circuit for fixedly storing an ID code given to each of the transmitters,
- a transmission signal generator for combining a digital signal from the A/D converter with an ID code read from the self-ID-code storage circuit in the manner of time division to generate a transmission signal, and outputting the transmission signal, and
- a transmission circuit for processing the transmission signal from the transmission signal generator in various ways as required to generate a transmission signal wave, and sending the transmission signal wave as a transmission wave through a transmission wave generator (for example, ultrasonic generator, infrared generator, transmitting antenna, etc.) into the air, and on the other hand the receiver has,
- an electrical signal generating device (for example, ultrasonic detector, infrared detector, receiving antenna, etc.) for receiving the transmission wave from the transmission wave generator in the transmitter to generate an electrical signal corresponding to the transmission wave,
- a signal processor circuit for processing the electrical signal from the electrical signal generating device, such as amplifying and demodulating, to generate a received signal corresponding to the transmission signal generated by the transmission signal generator in the transmitter, and outputting the received signal, and
- a correction circuit which stores a correction table for associating each value of the received sensor outputs with the sensor output corresponding to it (or a difference between both outputs) in advance for each of a plurality of the transmitters, the correction table being related to the ID code of the corresponding transmitter of the plurality of the transmitters, and when the received signal is input from the signal processor circuit, first reads the ID code from the portion associated with the ID code of the received signal and reads the received sensor output from the portion of the received signal other than the portion associated with the ID code, and further corrects the received sensor output such that it may be linear with respect to the sensor output on the basis of the correction table stored in relation to the read ID-code, and outputs the corrected received-sensor-output as an object of the indication.

The configuration described above provides a telemetering system that keeps a linear relationship between a sensor output of the result of detection by a sensor and a received sensor output indicated at the receiver even if an amplifier included in a transmitter is composed of relatively low-quality and inexpensive parts.

The third invention adds the following components to the correction circuit of the receiver in the telemetering system according to the second invention.

That is, the correction circuit further comprises,

- a reference voltage input portion for receiving a variable reference voltage, and
- correction table creating means which, when a variable reference voltage is applied to the reference voltage input portion, every time the reference voltage changes, reads the ID code from the portion associated with the ID code of a signal from the signal processor circuit and reads the received output from the portion of the signal other than the portion associated with the ID code, and stores the received output in association with the reference voltage (or a difference between them) at the time, these operations being repeated for each change of the reference voltage to create a correction table for associating each value of the received outputs with a value of the reference voltage (or a difference between them) corresponding to it, and further stores the correction table in relation to the read ID-code.

The configuration described above provides a telemetering system that keeps a linear relationship between a sensor output of the result of detection by a sensor and a received sensor output indicated at the receiver even if an amplifier included in a transmitter is composed of relatively low-quality and inexpensive parts. In addition to this, the work for creating the essential correction table of the telemetering system can be made easier by the above configuration.

The fourth invention provides a method for creating a correction table, in which the correction table creating means described above is used in the correction circuit in the receiver in the telemetering system according to the third invention to create the correction table as follows.

That is, the correction table is created through the three steps of,

- the first step of disconnecting the sensor from the transmitter,
- the second step of connecting a variable reference-voltage generator to the sensor connecting terminal of the transmitter and to the reference voltage input portion of the receiver such that an identical value of the reference voltage may be always applied to them, and
- the third step of controlling the variable reference-voltage generator to change the generated reference voltage within the range of variations in the sensor output.

The above described method allows accurate and easy creation of the correction table by using the correction table creating means in the correction circuit in the receiver used in the telemetering system according to the third invention.

The fifth invention adds the following components to the telemetering system according to the third invention.

That is, the transmitter includes a single circuit unit in which the amplifier, the A/D converter, the self-ID code storage circuit and the transmission signal generator are integrated, the circuit unit being removable from other circuit portions, and the input end of the correction circuit in the receiver is adapted to receive a signal from the transmission signal generator included in the circuit unit instead of the received signal from the signal processor circuit.

The configuration described above provides a telemetering system that keeps a linear relationship between a sensor output of the result of detection by a sensor and a received sensor output indicated at the receiver even if an amplifier included in a transmitter is composed of relatively low-quality and inexpensive parts. In addition to this, the work for creating the essential correction table of the telemetering system can be made further easier.

The sixth invention provides a method for creating the correction table, in which the correction table creating means described above is used in the correction circuit of the receiver in the telemetering system according to the fifth invention to create the correction table as follows.

That is, the correction table is created through the four steps of,

- the first step of removing the circuit unit from the transmitter,
- the second step of inputting a signal from the transmission signal generator of the circuit unit, instead of the received signal, to the correction circuit in the receiver, the third step of connecting the variable reference-voltage generator to the input end of the amplifier of the circuit unit and to the reference voltage input portion of the correction circuit such that an identical value of the reference voltage may be always applied to them, and the fourth step of controlling the variable reference-voltage generator to change the generated reference-voltage within the range of variations in the sensor output.

The method described above allows the accurate and easy work for creating the correction table by using the correction table creating means of the correction circuit in the receiver in the telemetering system in accordance with the fifth invention.

BEST MODE FOR CARRYING OUT THE INVENTION

In order to explain the invention in more detail, the description will be taken in conjunction with the accompanying figures.

Figure 1A:
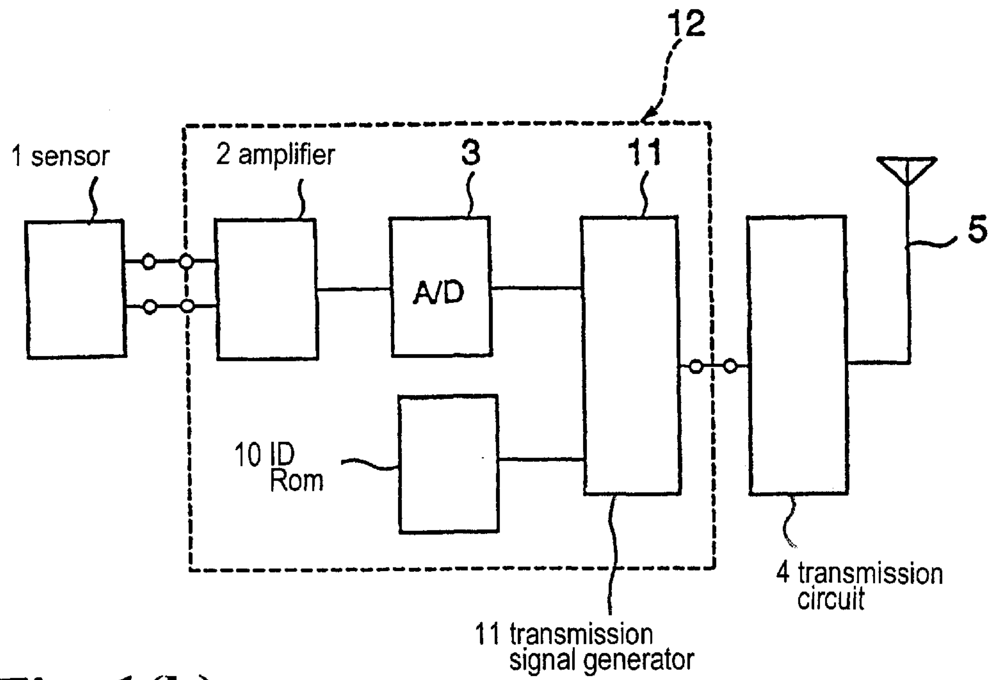
FIGS. 1(*a*) and 1(*b*) show a circuit configuration of a preferable telemetering system according to the invention.
Figure 1B:
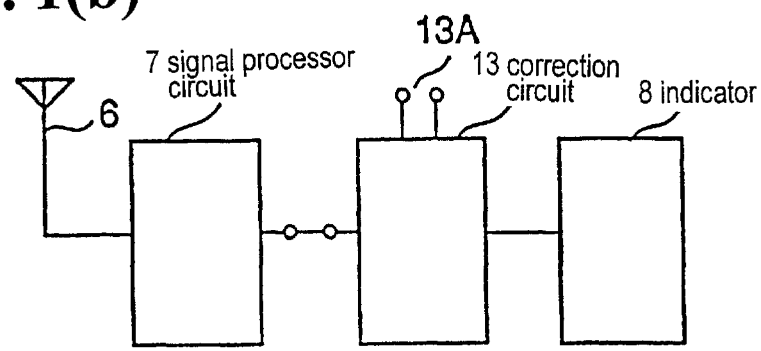

FIGS. 1(*a*) and 1(*b*) show a configuration of the telemetering system according to the best mode (i.e. preferable embodiment) of the invention. FIGS. 1(*a*) and 1(*b*) show a transmitter and a receiver, respectively. From comparison of FIGS. 1(*a*) and 1(*b*) and FIGS. 2(*a*) and 2(*b*) showing a conventional telemetering system, it can be seen that the present embodiment has respectively an ID ROM 10 and a transmission signal generator 11 in the transmitter and a correction circuit 13 in the receiver, in addition to the conventional system. Further, an amplifier 2 is composed of relatively inexpensive and low-quality parts, so that it has a poor linearity between its input and output.

Figure 2A:
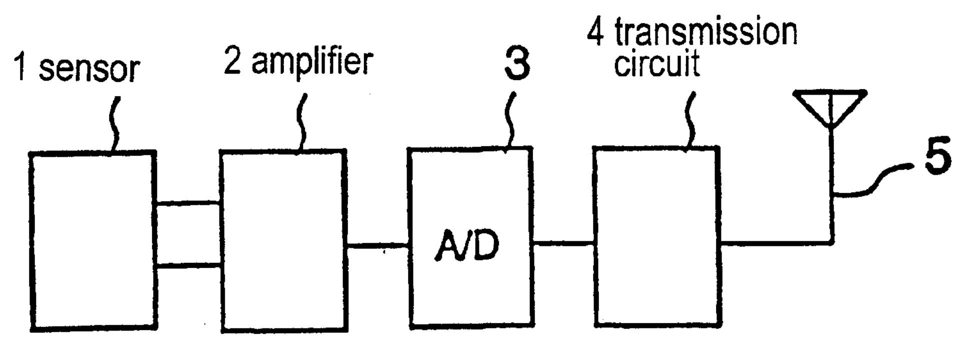
FIGS. 2(*a*) and 2(*b*) are illustrations of a conventional telemetering system.
Figure 2B:
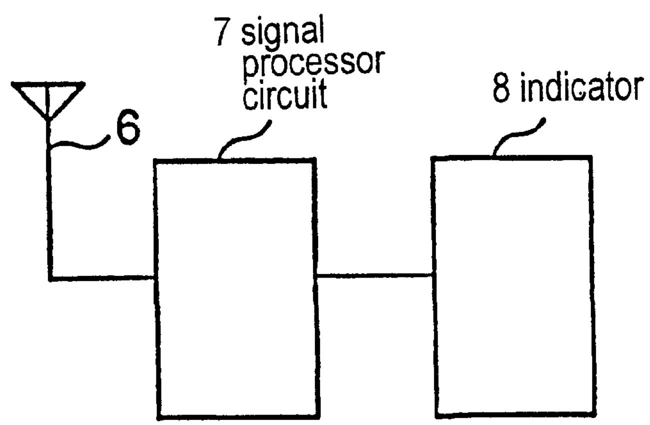

In the figures, the circuit portions of FIGS. 1(*a*) and 1(*b*) having the same configuration and functionality as those of FIGS. 2(*a*) and 2(*b*) are designated by the same reference signs as in FIGS. 2(*a*) and 2(*b*), and the descriptions of those circuits will be omitted. B3

The ID ROM 10 is a storage circuit that fixedly stores the ID code provided individually for each of the transmitters. The transmission signal generator 11 is a circuit for combining a digital signal from the A/D converter 3 with an ID code read out from the ID ROM 10 in the manner of time division to generate and output a transmission signal.

On the other hand, the correction circuit 13 in the receiver stores a correction table for associating each value of the received sensor outputs with the sensor output corresponding to it (or a difference between both outputs) in advance for each of a plurality of the transmitters (which potentially configure a telemetering system pairing up with the receiver), wherein the correction table is related to the ID code of the corresponding transmitter. When the received signal is input from the signal processor circuit 7 to the correction circuit 13, it first reads the ID code from the portion associated with the ID code of the received signal, and reads the received sensor output from the portion of the received signal other than the portion associated with the ID code. Further, the correction circuit 13 corrects the received sensor outputs such that they may be linear with respect to the sensor outputs on the basis of the correction table stored in relation to the read ID-code. Then, the correction circuit 13 outputs the corrected received-sensor-outputs.

The correction circuit 13 also has a reference voltage input terminal 13A connected to a variable reference-voltage generator as described later for receiving a variable reference voltage from it, and further has correction table creating means. When a variable reference voltage is applied to the reference voltage input terminal 13A, every time the reference voltage changes, the correction table creating means reads the ID code from the portion associated with the ID code of a signal from the signal processor circuit 7, and reads the received output from the portion of the signal other than the portion associated with the ID code, and then stores the received output in association with the reference voltage at the time (or a difference between them at the time), these operations being repeated for each change of the reference voltage. Thus, the correction table creating means creates a correction table for associating each value of the received outputs with the value of the variable reference voltage corresponding to it (or a difference between them), and stores the correction table in relation to the ID code.

Now, the operations of the telemetering system configured as described above according to this embodiment will be described. When the transmitter reaches to a target position of measurement, the sensor 1 of the transmitter provides a sensor output corresponding to a condition (for example, temperature) of the target position to the amplifier 2. The amplifier 2 amplifies the sensor output and outputs the amplified sensor-output to the A/D converter 3 (then, the low accuracy of the amplifier causes loss of the linearity between its input and output). The A/D converter 3 digitizes the sensor-output amplified by the amplifier 2 and outputs the digitized sensor-output to the transmission signal generator 11. Then, the transmission signal generator 11 combines the digital signal from the A/D converter 3 with the self-ID code read from the ID ROM 10 in the manner of time division to generate a transmission signal, and outputs it to the transmission circuit 4. When the transmission signal is input, the transmission circuit 4 modulates a predetermined carrier with the transmission signal and processing the resultant modulated carrier, such as power-amplifying, to generate a transmission signal wave, and emits the transmission signal wave as a transmission wave through the antenna 5 into the air.

When the transmission wave reaches to a receiver as described above, on the side of the receiver, the antenna 6 receives the transmission wave and generates a corresponding electrical signal and outputs it to the signal processor circuit 7. The signal processor circuit 7 processes the electrical signal, such as amplifying and demodulating, to generate a received signal corresponding to the sensor output, or a received sensor output, and outputs it to the correction circuit 13. Then, the correction circuit 13 first reads the ID code from the portion associated with the ID code of the received signal and reads the received sensor output from the portion of the received signal other than the portion associated with the ID code. Further, the correction circuit 13 corrects the received sensor output such that it may be linear with respect to the sensor output on the basis of the correction table which is in advance stored in relation to the read ID-code (thereby, the non-linearity introduced by the amplifier 2 is eliminated). Then, the correction circuit 13 outputs the corrected received-sensor-output to the indicator 8. The indicator 8 indicates the corrected received-sensor-output in such a manner that measurement-persons can recognize it.

Next, a method for storing in advance the correction table used in correcting operation into the correction circuit 13 and the operations for executing the method will be described. First, the sensor 1 is disconnected from the transmitter and the input end of the amplifier 2 is made open. Then, a sensor connection end of the transmitter (i.e. input end of the amplifier 2) and the reference voltage input terminal 13A of the correction circuit 13 in the receiver are connected to an identical variable-reference-voltage generator (that is, the input ends of the amplifier 2 and the reference voltage input terminals 13A are placed in parallel across the variable reference-voltage generator in consideration of polarity). Thus, an identical value of the reference voltage is always applied to the two inputs.

Then, the variable reference-voltage generator is controlled to change a generated reference voltage within the range of variations in the sensor output. At this time, in the transmitter, the generated reference voltage instead of a sensor output is amplified by the amplifier 2, output to the A/D converter 3, and processed into a transmission signal by the transmission signal generator 11. Then, a transmission wave corresponding to the transmission signal is sent from the transmitting antenna 5. On the other hand, in the receiver, an electrical signal corresponding to the transmission wave is provided from the receiving antenna 6 to the signal processor circuit 7, and is subjected to processing such as amplification and demodulation in the signal processor circuit 7. Thus, the received signal corresponding to the reference signal (a replacement for a sensor output) is output from the signal processor circuit 7 to the correction circuit 13.

At this time, the reference voltage is applied to the reference voltage input terminal 13A of the correction circuit 13 as described above. Therefore, every time the reference voltage changes, the correction table creating means works so as to read the ID code from the portion associated with the ID code of the received signal from the signal processor circuit 7 and read the received output (in this case, a received reference voltage) from the portion of the received signal other than the portion associated with the ID code, and then store the received signal in association with the reference voltage (or a difference between them) at the time. These operations are repeated for each change of the reference voltage. Thus, the correction table creating means creates a correction table for associating each value of the received outputs with a value of the variable-reference-voltage (or a difference between both values) corresponding it, and stores the correction table in relation to the read ID-code as described above.

Then, when the transmitter is replaced with a different transmitter and the same procedures as described above are performed for it, the same operations are performed, so that a new correction table related to the different transmitter is stored in the correction circuit 13. Thus, the correction tables for a plurality of the transmitters are created in the correction circuit 13. Now, another preferable embodiment of the invention will be described. This embodiment is almost similar to the previous embodiment in regard to the circuit configuration and operations. However, this embodiment is different from the previous embodiment in the following points. That is, the amplifier 2, A/D converter 3, ID ROM 10, and transmission signal generator circuit 11 in the transmitter are integrated into a single circuit unit 12, which can be removed from other circuit portions. On the other hand, the receiver is provided with a predetermined circuit-unit-mounting portion. The circuit-unit-mounting portion is designed such that, when the circuit unit 12 is mounted to it, the input end of the correction circuit 13 may be connected to the output end of the transmission signal generator 11 in the circuit unit 12 instead of the output end of the signal processor circuit 7.

Now, a method for storing in advance the correction tables used for correcting operation into the correction circuit 13 and the operations for executing the method according to this embodiment will be described. First, the circuit unit 12 is removed from the transmitter and then mounted to the circuit-unit-mounting portion in the receiver. Further, the input end of the amplifier 2 in the circuit unit 12 and the reference voltage input end 13A of the correction circuit 13 are connected to one variable reference-voltage generator such that an identical reference voltage may be applied to both input ends. Then, the reference voltage generator is controlled to change the reference voltage within the range of variations in the sensor output. For this case, it is clearly understood that the received signals provided from the signal processor circuit 7 during operation for storing the correction-tables according to the previous embodiment and the signals supplied from the transmission signal generator 11 to the correction circuit 13 in the above circuit configuration according to this embodiment are the digital signals having identical contents. Therefore, it can be said that the same operations as in the previous embodiment are also performed in this embodiment.

Now, the scope of the invention is not limited to the two embodiments described above, applications in various variations are possible. For example, although the two embodiments have provided the transmitters for transmitting digitized transmission-information, it is also possible that this information can be transmitted in an analog signal after V/F conversion and, in the receiver, the received signal is subjected to F/V conversion and A/D conversion, and input to the correction circuit.

INDUSTRIAL APPLICABILITY

As described above, the telemetering system according to the invention is useful in keeping a linear relationship between a sensor output of the result of detection by a sensor and a received sensor output indicated at the receiver even if an amplifier included in a transmitter is composed of relatively low-quality and inexpensive parts.

What is claimed is:

1. A telemetering system that has a transmitter comprising a sensor and transmitting a transmission wave modulated with an output signal corresponding to a sensor output from the sensor, and a receiver for receiving the transmission wave from the transmitter, processing the transmission wave to generate a received sensor output corresponding to the sensor output, and indicating the received sensor output, wherein the transmitter has, an amplifier for amplifying the sensor output, an A/D converter for digitizing an output of the amplifier, a self-ID-code storage circuit for fixedly storing an identification code given to each of the transmitters, a transmission signal generator for combining a digital signal from the A/D converter with the identification code read from the self-ID-code storage circuit in a manner of time division to generate a transmission signal, and outputting the transmission signal, and a transmission circuit for processing the transmission signal from the transmission signal generator in various ways as required to generate a transmission signal wave and sending the transmission signal wave as the transmission wave through a transmission wave generator into air, and the receiver has, an electrical signal generating device for receiving the transmission wave from the transmission wave generator in the transmitter to generate an electrical signal corresponding to the transmission wave, a signal processor circuit for processing the electrical signal from the electrical signal generating device to generate a received signal corresponding to the transmission signal generated by the transmission signal generator in the transmitter, and outputting the received signal, and a correction circuit which stores a correction table for associating each value of received sensor outputs with the sensor output corresponding to it or a difference of two outputs in advance for each of a plurality of the transmitters, the correction table being related to the identification code of the corresponding transmitter of the plurality of the transmitters, and when the received signal is input from the signal processor circuit, first reads the ID code from a portion of the received signal associated with the identification code and reads the received sensor output from another portion of the received signal other than the portion associated with the identification code, and further corrects the received sensor output such that it may be linear with respect to the sensor output on the basis of the correction table stored in relation to read identification code, and outputs the received sensor output as an object of indication.

2. The telemetering system according to claim 1, wherein the correction circuit in the receiver further has, a reference voltage input portion for receiving a variable reference voltage, and correction table creating means which, when the variable reference voltage is applied to the reference voltage input portion, every time the reference voltage changes, reads the identification code from the portion of the received signal associated with the identification code from the signal processor circuit and reads the received output from the another portion of the received signal other than the portion associated with the identification code, and stores the received output in association with the reference voltage or a difference between them at the time, these operations being repeated for each change of the reference voltage to create the correction table for associating each value of the received outputs with a value of the reference voltage or a difference between them corresponding to it, and further stores the correction table in relation to the read identification code.

3. A method for creating a correction table, in which said correction table creating means is used in the correction circuit of the receiver in the telemetering system according to claim 2, comprising the steps of, disconnecting the sensor from the transmitter, connecting a variable reference-voltage generator to a sensor connecting terminal of the transmitter and to the reference voltage input portion of the receiver such that an identical value of the reference voltage may be always applied to them, and controlling the variable reference-voltage generator to change the reference voltage within a range of variations in the sensor output.

4. The telemetering system according to claim 2, wherein the transmitter includes a single circuit unit in which the amplifier, the A/D converter, the self-ID code storage circuit and the transmission signal generator are integrated, the circuit unit being removable from other circuit portions, and the receiver receives the transmission signal from the transmission signal generator included in the circuit unit through an input end of the correction circuit instead of the received signal from the signal processor circuit.

5. A method for creating correction table, in which said correction table creating means is used in the correction circuit in the receiver in the telemetering system according to claim 4, comprising the steps of, removing the circuit unit from the transmitter, inputting the transmission signal from the transmission signal generator of the circuit unit, instead of the received signal, to the correction circuit in the receiver, connecting a variable reference-voltage generator to an input end of the amplifier of the circuit unit and to the reference voltage input portion of the correction circuit such that an identical value of the reference voltage may be always applied to them, and controlling the variable reference-voltage generator to change the reference voltage within a range of variations in the sensor output.

* * * * *